US012366833B2

(12) United States Patent
Mestrie et al.

(10) Patent No.: US 12,366,833 B2
(45) Date of Patent: Jul. 22, 2025

(54) METHOD FOR ADJUSTING A CLOCK ON BOARD A MOTOR VEHICLE AND ASSOCIATED ADJUSTING DEVICE

(71) Applicant: Continental Automotive GmbH, Hannover (DE)

(72) Inventors: Christophe Mestrie, Toulouse (FR); Sébastien Chanal, Toulouse (FR); Bertrand Venzal, Toulouse (FR); Stefan Hammes, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 742 days.

(21) Appl. No.: 17/765,604

(22) PCT Filed: Oct. 29, 2020

(86) PCT No.: PCT/EP2020/080424
§ 371 (c)(1),
(2) Date: Mar. 31, 2022

(87) PCT Pub. No.: WO2021/094098
PCT Pub. Date: May 20, 2021

(65) Prior Publication Data
US 2022/0365490 A1 Nov. 17, 2022

(30) Foreign Application Priority Data
Nov. 12, 2019 (FR) ........................................ 1912618

(51) Int. Cl.
*G04R 40/06* (2013.01)
*G04R 20/02* (2013.01)

(52) U.S. Cl.
CPC ............. *G04R 40/06* (2013.01); *G04R 20/02* (2013.01)

(58) Field of Classification Search
CPC ................................ G04R 40/06; G04R 20/02
(Continued)

(56) References Cited

U.S. PATENT DOCUMENTS 10,514,465 B2 * 12/2019 Namineni ................. G06F 1/14
2005/0013394 A1 1/2005 Rausch et al.
(Continued)

FOREIGN PATENT DOCUMENTS

CN 101043253 A 9/2007
CN 101344759 A 1/2009
(Continued)

OTHER PUBLICATIONS

International Search Report and Written Opinion for International Application No. PCT/EP2020/080424, mailed Jan. 20, 2021, with partial English translation, 8 pages.
(Continued)

*Primary Examiner* — Edwin A. Leon
*Assistant Examiner* — Kevin Andrew Johnston
(74) *Attorney, Agent, or Firm* — Buchanan Ingersoll & Rooney PC

(57) ABSTRACT

A method for adjusting a clock on board a motor vehicle, the clock providing an actual time for functions of the vehicle, the vehicle connected via wireless communication to a data server, the method including: the server transmitting a sequence of consecutive actual-time values, separated from one another by a fixed time interval; the vehicle receiving the actual-time values shifted by an unknown and variable time of flight between transmission and reception; for each received actual-time value: calculating a difference between an actual-time value received at a given instant and an actual-time value received at a previous instant; calculating a discrepancy between the calculated difference and the fixed time interval; calculating a cumulative disparity, con-
(Continued)

sisting in summing the discrepancy calculated for a time value received at one instant and a time value received at the previous instant; determining the actual time for adjusting the on-board clock according to the disparity.

10 Claims, 2 Drawing Sheets

(58) Field of Classification Search
USPC .......................................................... 368/47
See application file for complete search history.

(56) References Cited

U.S. PATENT DOCUMENTS

| | | | | |
|---|---|---|---|---|
| 2010/0030916 | A1* | 2/2010 | Greenwood Graham | H04W 56/006 709/248 |
| 2016/0208906 | A1 | 7/2016 | Hechler et al. | |
| 2016/0357159 | A1* | 12/2016 | Abo El-Fotouh | G04G 5/00 |
| 2019/0137949 | A1* | 5/2019 | Inoue | G04R 20/14 |

FOREIGN PATENT DOCUMENTS

| | | | | | |
|---|---|---|---|---|---|
| CN | 102520608 | A | | 6/2012 | |
| CN | 108873680 | A | | 11/2018 | |
| CN | 109765578 | A | | 5/2019 | |
| DE | 102013212106 | A1 | | 1/2015 | |
| JP | 2009008444 | A | * | 1/2009 | G04G 5/00 |

OTHER PUBLICATIONS

International Search Report and Written Opinion for International Application No. PCT/EP2020/080424, mailed Jan. 20, 2021, 12 pages (French).

English Translation of Written Opinion for International Application No. PCT/EP2020/080424, dated Jan. 20, 2021, 7 pages.

Ying et al., "Clock Synchronization Based on Fitting Offset," Dissertation, Aug. 2008, vol. 34(16), Computer Engineering, pp. 13-15.

Chinese Office Action for Chinese Application No. 202080078297.7, dated Aug. 29, 2023 with translation, 12 pages.

* cited by examiner

METHOD FOR ADJUSTING A CLOCK ON BOARD A MOTOR VEHICLE AND ASSOCIATED ADJUSTING DEVICE

CROSS REFERENCE TO RELATED APPLICATIONS

This application is the U.S. National Phase Application of PCT International Application No. PCT/EP2020/080424, filed Oct. 29, 2020, which claims priority to French Patent Application No. 1912618, filed Nov. 12, 2019, the contents of such applications being incorporated by reference herein.

FIELD OF THE INVENTION

The invention relates to a method for adjusting a clock on board a motor vehicle and associated adjusting device. The invention applies more particularly to what are referred to as "connected" vehicles, that is to say to vehicles having an on-board communication device giving access to an Internet server using a wireless network of the Wi-Fi® or Bluetooth® type, or using a cellular telephone network equipped with 3G, 4G or 5G technology.

BACKGROUND OF THE INVENTION

Motor vehicles comprise an on-board clock which is necessary for many vehicle functions, making it possible to obtain information with regard to the actual time. One of these functions consists, for example, of car sharing. A user possesses a virtual key saved, for example, on his/her smartphone, which allows him/her to access a vehicle, for example a rental vehicle, during a predetermined activation period. This predetermined period is stored in memory in the vehicle and measured using its on-board internal clock, after a preliminary phase of synchronizing the actual time between the clock of the vehicle and the clock of the virtual key. It is also necessary to synchronize the actual time between the clock of the vehicle and that of the virtual key with a fixed frequency for any virtual key for accessing a vehicle of "hands-free" type.

Clocks on board vehicles are generally electronic clocks, operating on the basis of a quartz crystal. However, these electronic clocks are sensitive to heat, and their accuracy with regard to the actual time is therefore impacted when the electronic control unit in which they are located heats up. In the case of car sharing, this drift in the measurement of the actual time may generate an incorrect activation period for the virtual key which is either shortened or lengthened with respect to the actual activation period. This is a major drawback for the user.

One solution from the prior art consists in adjusting the internal clock to the time given by the clock of the GPS (Global Positioning System) or geolocation system on board the vehicle which, for its part, is accurate. Specifically, satellite positioning systems transmit radio waves which contain time information based on very accurate atomic clocks. However, this solution has a major drawback. Specifically, the time information provided by the GPS to the vehicle is not secure and can be hacked.

Another solution from the prior art consists in adjusting the internal clock to the time given by a server to which the vehicle is connected. The vehicle sends a request to the server to update its actual-time base and in return receives a response containing a corrected time. The connection between the server and the vehicle is secure and the time information provided by the server to the vehicle is encrypted and signed; therefore it cannot be hacked.

However, the times of flight of the request and of the response between the vehicle and the server are unknown and difficult to measure, and the received corrected time is therefore inaccurate because it would be necessary to subtract from it the outward and return times of flight between the vehicle and the server, which are up to a few tens of seconds, even half a minute.

SUMMARY OF THE INVENTION

It is therefore necessary to be able to accurately and securely adjust the clock on board the vehicle.

An aspect of the present invention proposes a method for adjusting the clock on board a motor vehicle which overcomes the problems of the prior art. In this case, the adjusting method makes it possible to securely obtain more reliable actual-time information.

An aspect of the invention relates to a method for adjusting a clock on board a motor vehicle, said clock providing an actual time for functions of the vehicle, said vehicle being connected via wireless communication to a data server, said method comprising the following steps:

a. the server transmitting a sequence of consecutive actual-time values, all separated from one another by a fixed time interval,
b. the vehicle receiving the actual-time values shifted by an unknown and variable time of flight between transmission and reception,
c. and, for each received actual-time value:
d. calculating a difference between an actual-time value received at a given instant and an actual-time value received at a previous instant,
e. calculating a discrepancy between said difference thus calculated and the fixed time interval,
f. calculating a cumulative disparity, consisting in summing the discrepancy calculated for a time value received at one instant and a time value received at the previous instant,
g. determining the actual time for adjusting the on-board clock according to said disparity.

Preferably, the sequence includes a predetermined number of consecutive actual-time values.

Advantageously, the actual time for adjusting the clock is the received actual-time value corresponding to the calculated minimum cumulative disparity.

Expediently, the server transmits the sequence of consecutive values repeatedly with a predetermined frequency.

When the vehicle comprises a geolocation system, the method further comprises an additional step of receiving an actual-time value from the geolocation system and calculating a disparity between said value and the determined actual time, the actual time chosen for adjusting the clock being the actual-time value from the GPS if said disparity is smaller than a predetermined disparity.

An aspect of the invention also relates to any device for adjusting a clock on board a motor vehicle, said clock providing an actual time to vehicle functions, said device comprising means for wireless communication with a server, said device being noteworthy in that it further comprises: means for receiving actual-time values transmitted consecutively by the server and all separated from one another by a fixed time interval (x), said received values being shifted by an unknown and variable time of flight between transmission and reception, first means for calculating a difference between an actual-time value received at a given instant and an actual-time value received at a previous instant, second means for calculating a discrepancy between said difference thus calculated and the fixed time interval, means for calculating a cumulative disparity, consisting in summing the discrepancy calculated for a time value received at one instant and a time value received at the previous instant, and means for adjusting the on-board clock according to said disparity.

Preferably, the adjusting means further comprise means for determining a minimum value of the discrepancies which are calculated for each received actual-time value, and the corresponding received actual-time value.

An aspect of the invention also relates to a data server communicating wirelessly with a motor vehicle, which is noteworthy in that it is suitable for consecutively sending a sequence of actual-time values, all separated by a fixed time interval.

Preferably, said sequence is transmitted repeatedly with a predetermined frequency.

Finally, an aspect of the invention applies to any motor vehicle communicating wirelessly with a data server, comprising an adjusting device according to any one of the features listed above.

BRIEF DESCRIPTION OF THE DRAWINGS

Other features and advantages of aspects of the invention will become more apparent from reading the description which follows. This description is purely illustrative and must be read with reference to the attached drawings, in which.

DETAILED DESCRIPTION OF THE PREFERRED EMBODIMENTS

Figure 1:
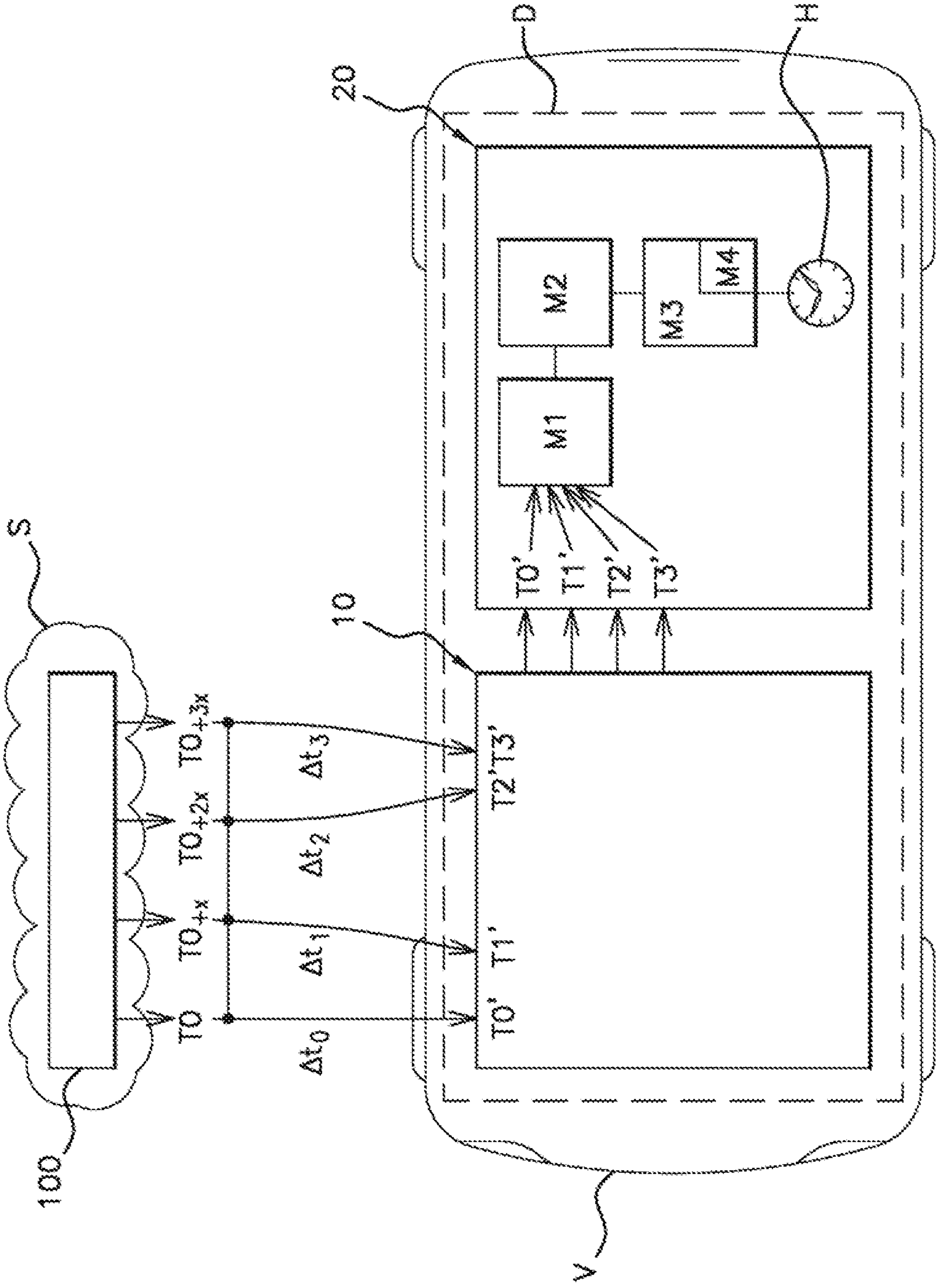
FIG. 1 schematically shows the vehicle, which is connected to a data server and comprises the device for adjusting the clock on board the vehicle, according to an aspect of the invention.

FIG. 1 shows a motor vehicle V which is connected, via a wireless connection of receiver 10, of the Wi-Fi or Bluetooth type, or of 3G, 4G, or 5G telephone/Internet connection type, to a data server S. The wireless communication protocols are known from the prior art and will not be further detailed here.

According to an aspect of the invention, the data server S is suitable for consecutively wirelessly sending a sequence of actual-time values all shifted from one another by a fixed time interval x. For this purpose, it possesses transmitting means 100 which are, for example, in software form. In other words, the data server sends, at a first instant, a value representative of the actual time, for example T0=10:00:00, then sends, at a second instant consecutive to the first, a second value representative of the actual time, but shifted by a fixed time interval x, for example x=30 s, therefore T1=T0+x=10:00:30. The method is repeated for a predetermined number N of values; for example the sequence includes 5 actual-time values, N=5, and the transmission sequence is therefore the following:

TABLE 1

| | T0 | T1 | T2 | T3 | T4 |
|---|---|---|---|---|---|
| Transmitted actual-time values | 10:00:00 | 10:00:30 | 10:01:00 | 10:01:30 | 10:02:00 |

Preferably, the data server S sends said sequence with a predetermined frequency, for example, but not limited to, once a day.

The vehicle V comprises means (which are not shown) for wireless communication with the data server S, this being known to a person skilled in the art. The vehicle V also comprises an on-board clock H providing an actual time, which is necessary for implementing functions of the vehicle.

According to an aspect of the invention, the vehicle V also comprises a device D for adjusting the clock on board the vehicle V. Said adjusting device D comprises receiver 10 for receiving actual-time values sent by the server and electronic controller 20. Electronic controller 20 includes:

a. calculator M1 for calculating a difference between an actual-time value received at a given instant and an actual-time value received at a previous instant, b. calculator M2 for calculating a discrepancy between said difference thus calculated and the fixed time interval, c. calculator M3 for calculating a cumulative disparity, consisting in summing the discrepancy calculated for a time value received at one instant and a time value received at the previous instant, d. clock H, and e. adjuster M4 for adjusting clock H according to said cumulative disparity.

In a preferred embodiment of the invention, the adjusting means M4 further comprise means (which are not shown) for determining a minimum value of the disparities which are calculated for each received actual-time value, and the corresponding received actual-time value.

Figure 2:
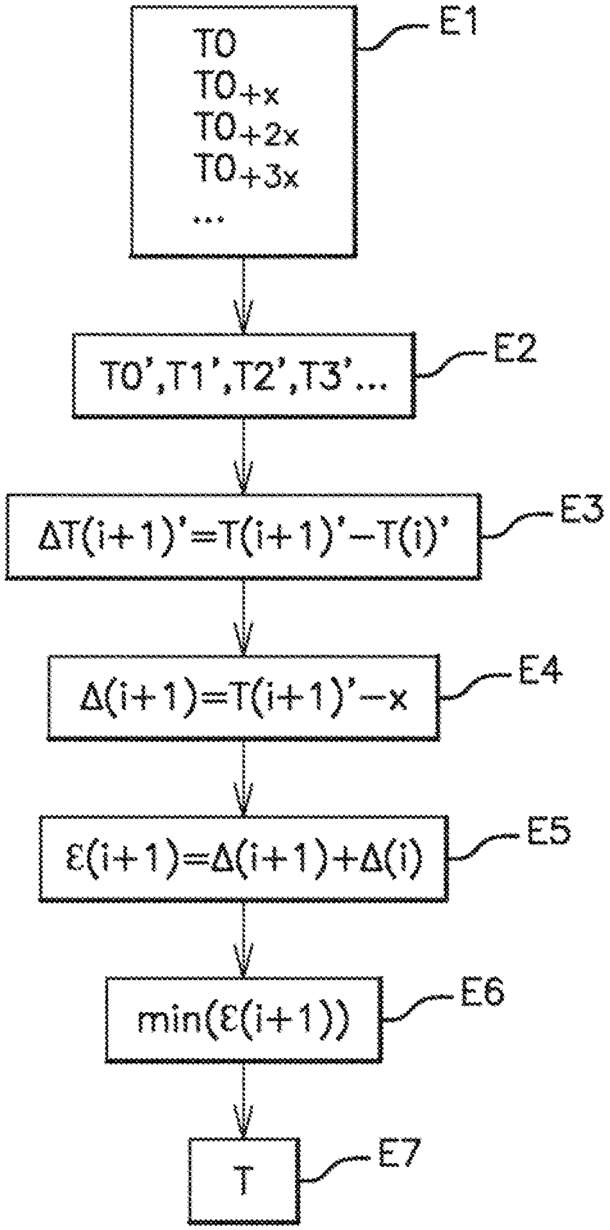
FIG. 2 is a flowchart showing the various steps of the method for adjusting the clock on board the vehicle according to an aspect of the invention.

The adjusting method, which is illustrated in FIG. 2, will now be described. In a preliminary step (which is not shown), the data server S is fitted with transmitting means 100 and the vehicle is fitted with the adjusting device D which were described above.

In a first step E1, the data server S wirelessly transmits, via BLE, Wi-Fi or other communication, a sequence of N consecutive actual-time values T0, T1, T2, T3, T4 all separated by a fixed interval x, as illustrated in table 1.

The vehicle V, more particularly the receiving means 10, receives or receive, in a second step E2, the actual-time values, which will be named T0', T1', T2', T3', T4'. However, these received time values are shifted with respect to the transmitted time values; specifically, the time of flight between the server and the vehicle, that is to say between transmission and reception of said values, is unknown and variable. Thus:

$$T0'=T0+\Delta t0 \quad \text{[Math 1]}$$

$$T1'=T1+\Delta t1 \quad \text{[Math 2]}$$

$$T2'=T2+\Delta t2 \quad \text{[Math 3]}$$

$$T3'=T3+\Delta t3 \quad \text{[Math 4]}$$

$$T4'=T4+\Delta t4 \quad \text{[Math 5]}$$

where

T0, T1, T2, T3, T4 are actual-time values transmitted by the server S and T0', T1', T2', T3', T4' are actual-time values received by the vehicle V.

For example:

TABLE 2

| | T0 | T1 | T2 | T3 | T4 |
|---|---|---|---|---|---|
| Transmitted actual-time values | 10:00:00 | 10:00:30 | 10:01:00 | 10:01:30 | 10:02:00 |
| | T0' | T1' | T2' | T3' | T4' |
| Received actual-time values | 10:00:09 | 10:00:35 | 10:01:05 | 10:01:32 | 10:02:09 |

In a third step E3, a difference ΔT(i+1)' between the actual-time value received at one instant (i+1) and the actual-time value received at a previous instant (i) is calculated for each received actual-time value, or:

$$\Delta T(i+1)'=T(i+1)'-Ti' \quad \text{[Math 6]}$$

or:

$$\Delta T1'=T1'-T0' \quad \text{[Math 7]}$$

This is calculated for each received actual-time value.

In the fourth step E4, a discrepancy between the difference thus calculated previously and the fixed interval x is calculated for each received actual-time value, or:

$$\Delta(i+1)=\Delta T(i+1)'-x \quad \text{[Math 8]}$$

or:

$$\Delta 1=\Delta T1'-x \quad \text{[Math 9]}$$

The following table is therefore obtained:

TABLE 3

| | T0 | T1 | T2 | T3 | T4 |
|---|---|---|---|---|---|
| Transmitted actual-time values | 10:00:00 | 10:00:30 | 10:01:00 | 10:01:30 | 10:02:00 |
| | T0' | T1' | T2' | T3' | T4' |
| Received actual-time values | 10:00:09 | 10:00:35 | 10:01:05 | 10:01:32 | 10:02:09 |
| | ΔT0' | ΔT1' | ΔT2' | ΔT3' | ΔT4' |
| ΔT(i + 1)' | 0 | 00:00:26 | 00:00:30 | 00:00:27 | 00:00:37 |
| | Δ0 | Δ1 | Δ2 | Δ3 | Δ4 |
| Δ(i + 1)' | | −4 | 0 | −3 | 7 |

In the next step (step E5), a cumulative disparity ε(i+1) is determined for each received actual-time value by adding the discrepancy thus calculated at one instant (i+1) to the discrepancy calculated for the actual-time value received at the previous instant (i), or:

$$\varepsilon(i+1)=\Delta(i+1)+\Delta(i) \quad \text{[Math 10]}$$

or:

$$\varepsilon 1=\Delta 1+\Delta 0 \quad \text{[Math 11]}$$

The actual-time value to be used for adjusting the on-board clock H of the vehicle V is then determined from among all the received actual-time values. This is done by taking the received actual-time value which has the smallest cumulative disparity (step E6), or the minimum value of the cumulative disparities, min(ε(i+1)). The following table is therefore obtained:

TABLE 4

| | T0 | T1 | T2 | T3 | T4 |
|---|---|---|---|---|---|
| Transmitted actual-time values | 10:00:00 | 10:00:30 | 10:01:00 | 10:01:30 | 10:02:00 |
| | T0' | T1' | T2' | T3' | T4' |
| Received actual-time values | 10:00:09 | 10:00:35 | 10:01:05 | 10:01:32 | 10:02:09 |
| | ΔT0' | ΔT1' | ΔT2' | ΔT3' | ΔT4' |
| ΔT(i + 1)' | 0 | 00:00:26 | 00:00:30 | 00:00:27 | 00:00:37 |
| | Δ0 | Δ1 | Δ2 | Δ3 | Δ4 |
| Δ(i + 1)' | | −4 | 0 | −3 | 7 |
| | ε0 | ε1 | ε2 | ε3 | ε4 |
| ε(i + 1)<br>min(ε(i + 1)) | | −4 | −4 | −7<br>−7 | 0 |

In this example, the received actual-time value to be used to adjust the clock (step E7), which has the shortest time of flight and therefore the best accuracy with respect to the actual-time value transmitted by the data server S, is T, which is equal to T3 or equal to 10:01:32; specifically, this received actual-time value has the smallest cumulative disparity, ε(3), which is equal to −7, and it can be seen that the actual time T3 is only two seconds behind the actual-time value transmitted by the data server S.

Of course, each received actual-time value is updated, that is to say incremented by a time base, by means of the clock H on board the vehicle V during the calculations described above until the actual-time value to be used is determined by the adjusting method according to an aspect of the invention.

In a second embodiment of the method according to the invention (which is not shown), the vehicle V comprises a GPS (Global Positioning System) or geolocation system and the adjusting method comprises an additional step in which the adjusting device D receives an actual-time value from the GPS and compares it with the actual-time value obtained in the last step of the method according to an aspect of the invention. If a disparity between these two values is smaller than a predetermined disparity, then the adjusting device D uses the actual-time value sent by the GPS in order to adjust the clock H on board the vehicle, because this actual-time value is more accurate. Specifically, it is then considered that the actual-time value time from the GPS cannot have been hacked.

An aspect of the invention therefore expediently and inexpensively makes it possible to accurately and securely adjust a clock on board a vehicle. The adjusting method according to an aspect of the invention makes it possible, inter alia:

a. to avoid the vehicle V having to send a request to the server to update its clock, b. to receive, in the vehicle V, an actual-time value which is not impacted by two times of flight, that of the request from the vehicle to the server and that of the response from the server to the vehicle, c. to securely adjust the clock in the vehicle on a daily basis.

The invention claimed is:

1. A method for adjusting a clock on board a motor vehicle, said clock providing an actual time for functions of the vehicle, said vehicle being connected via wireless communication to a data server, said method comprising:

the server transmitting a sequence of consecutive actual-time values, all separated from one another by a fixed time interval;

the vehicle receiving the actual-time values shifted by an unknown and variable time of flight between transmission and reception;

for each received actual-time value:

calculating a difference between an actual-time value received at a given instant and an actual-time value received at a previous instant, calculating a discrepancy between said difference thus calculated and the fixed time interval, and calculating a cumulative disparity, consisting in summing the discrepancy calculated for a time value received at one instant and a time value received at the previous instant, and determining the actual time for adjusting the on-board clock according to said disparity.

2. The adjusting method as claimed in claim 1, wherein the sequence includes a predetermined number of consecutive actual-time values.

3. The adjusting method as claimed in claim 1, wherein the actual time for adjusting the clock is the received actual-time value corresponding to the calculated minimum cumulative disparity.

4. The adjusting method as claimed in claim 1, wherein the server transmits the sequence of consecutive values repeatedly with a predetermined frequency.

5. The adjusting method as claimed in claim 1, wherein, when the vehicle comprises a geolocation system, the method further comprises an additional step of receiving an actual-time value from the geolocation system and calculating a disparity between said value and the determined actual time, the actual time chosen for adjusting the clock being the actual-time value from the GPS if said disparity is smaller than a predetermined disparity.

6. A device for adjusting a clock on board a motor vehicle for use with a server having wireless communication capability, said clock providing an actual time to vehicle functions, said device comprising:

a receiver wirelessly receiving actual-time values transmitted consecutively by the server and all separated from one another by a fixed time interval, said received values being shifted by an unknown and variable time of flight between transmission and reception;

an electronic controller adapted to:

calculate a difference between an actual-time value received at a given instant and an actual-time value received at a previous instant;

calculate a discrepancy between said difference thus calculated and the fixed time interval, calculate a cumulative disparity, consisting in summing the discrepancy calculated for a time value received at one instant and a time value received at the previous instant; and adjust the on-board clock according to said disparity.

7. The device as claimed in claim 6, wherein the electronic controller is further adapted to determine a minimum value of the cumulative disparity, which is calculated for each received actual-time value and the corresponding received actual-time value.

8. A data server communicating wirelessly with a motor vehicle, for implementing the method for adjusting a clock on board the motor vehicle as claimed in claim 1.

9. The data server as claimed in claim 8, wherein the data server consecutively sends a sequence of actual-time values, all separated by a fixed time interval and said sequence is transmitted repeatedly with a predetermined frequency.

10. A motor vehicle communicating wirelessly with a data server, comprising an adjusting device as claimed in claim 6.

* * * * *